US009561785B2

(12) United States Patent
Iizuka et al.

(10) Patent No.: US 9,561,785 B2
(45) Date of Patent: Feb. 7, 2017

(54) VEHICLE REAR WHEEL LIFT TENDENCY JUDGMENT DEVICE

(71) Applicants: HONDA MOTOR CO., LTD., Tokyo (JP); NISSIN KOGYO CO., LTD., Ueda-shi, Nagano (JP)

(72) Inventors: Chikashi Iizuka, Wako (JP); Makoto Toda, Wako (JP); Hiroki Kitagawa, Wako (JP); Tetsuya Hasegawa, Ueda (JP); Nobuyuki Kodaira, Ueda (JP); Tomoharu Tsuchiya, Ueda (JP)

(73) Assignees: HONDA MOTOR CO., LTD., Tokyo (JP); NISSIN KOGYO CO., LTD., Ueda-shi (JP)

( * ) Notice: Subject to any disclaimer, the term of this patent is extended or adjusted under 35 U.S.C. 154(b) by 0 days.

(21) Appl. No.: 14/625,323

(22) Filed: Feb. 18, 2015

(65) Prior Publication Data
US 2015/0232074 A1    Aug. 20, 2015

(30) Foreign Application Priority Data

Feb. 18, 2014  (JP) .................................. 2014-028242

(51) Int. Cl.
*G01M 17/00*  (2006.01)
*G06F 7/00*   (2006.01)
(Continued)

(52) U.S. Cl.
CPC ................ *B60T 8/172* (2013.01); *B60T 8/171* (2013.01)

(58) Field of Classification Search
CPC ............ B60T 8/171; B60T 8/172; B60T 8/00; B60T 8/1706; B60T 8/3225; B60T 8/1766; B60T 8/261; B60T 8/1764; B60T 2210/124; B60T 8/50; B60T 2230/03; B60T 2240/06; B62L 3/00; B62L 3/023
(Continued)

(56) References Cited

U.S. PATENT DOCUMENTS

2003/0066720 A1   4/2003  Sakamoto
2011/0098903 A1   4/2011  Ogawa et al.

FOREIGN PATENT DOCUMENTS

EP   0 537 724 A2   4/1993
EP   1 839 978 A1   10/2007
(Continued)

OTHER PUBLICATIONS

European Search Report dated May 12, 2015, issued in corresponding European Patent Application No. 15 15 5348 (2 pages).

*Primary Examiner* — Jaime Figueroa
(74) *Attorney, Agent, or Firm* — Westerman, Hattori, Daniels & Adrian, LLP

(57) ABSTRACT

A vehicle rear wheel lift tendency judgment device: includes a first deceleration obtaining device for obtaining a first deceleration along a first straight line, being a component in a first direction of an acceleration on a center of gravity, and a second deceleration obtaining device for obtaining a second deceleration along a second straight line, being a component in a second direction of the acceleration; judges that a rear wheel tends to be lifted, when the first deceleration is greater in the first direction than a first threshold, or when the second deceleration is greater in the second direction than a second threshold; and performs at least one of setting for shifting the first threshold in a direction opposite to the first direction and setting for shifting the second threshold in a direction opposite to the second direction, when a second-deceleration change rate being a change amount in the second deceleration per unit time (Continued)

becomes greater in the second direction than a change-rate threshold, enabling a quick judgment of a rear wheel lift tendency.

9 Claims, 18 Drawing Sheets

(51) Int. Cl.
    *G06F 19/00*     (2011.01)
    *B60T 8/172*     (2006.01)
    *B60T 8/171*     (2006.01)

(58) Field of Classification Search
    USPC .................................................. 701/1, 34.1
    See application file for complete search history.

(56) References Cited

FOREIGN PATENT DOCUMENTS

| EP | 1 842 755 A1 | 10/2007 |
| EP | 2 003 033 A1 | 12/2008 |
| EP | 2 123 529 A1 | 11/2009 |
| JP | 2009-184486 A | 8/2009 |
| JP | 2009-241770 A | 10/2009 |

VEHICLE REAR WHEEL LIFT TENDENCY JUDGMENT DEVICE

BACKGROUND OF THE INVENTION

Field of the Invention

The present invention relates to a vehicle rear wheel lift tendency judgment device.

Description of the Related Art

While a vehicle is traveling, sudden braking sometimes causes a so-called rear wheel lift phenomenon (hereinafter referred to as a rear wheel lift) in which a shift of load to a front wheel lifts a rear wheel.

There has been a conventionally-known technique for judging whether or not the rear wheel becomes more likely to be lifted. For example, Japanese Patent Application Laid-open No. 2009-241770 discloses a technique for judging the rear wheel becomes more likely to be lifted on the basis of criteria that: a vehicle's deceleration exceeds a predetermined deceleration; and an amount of change in a difference in speed between the front and rear wheels exceeds a predetermined amount for a length of time longer than a predetermined length.

A problem with such a technique, however, is that a judgment on tendency of the rear wheel lift cannot be made more quickly beyond some limit because the detection of the difference in speed between the front and rear wheels has to be waited for until the difference in speed occurs between the front and rear wheels.

SUMMARY OF THE INVENTION

The present invention has been made with the foregoing situation taken into consideration. An object of the present invention is to provide a vehicle rear wheel lift tendency judgment device capable of making a quick judgment on the tendency of the rear wheel lift.

For the purpose of achieving the object, the present invention uses the following means.

Specifically, according to a first aspect of the present invention, there is provided a vehicle rear wheel lift tendency judgment device which is installed in a vehicle including a front wheel and a rear wheel, and judges whether or not the rear wheel is likely to be lifted, wherein when in a side view, a first straight line represents a straight line which joins a center of gravity of the vehicle and a ground contact point of the front wheel; a second straight line represents a straight line which passes the center of gravity and is orthogonal to the first straight line; a first direction represents a direction which extends along the first straight line, and which points from the center of gravity to the ground contact point; and a second direction represents a direction which extends along the second straight line, and in which the vehicle turns forward around the ground contact point, the judgment device comprises a first deceleration obtaining device for obtaining a first deceleration which is a component in the first direction of an acceleration on the center of gravity, and a second deceleration obtaining device for obtaining a second deceleration which is a component in the second direction of the acceleration on the center of gravity, the judgment device judges that the rear wheel is likely to be lifted, when the first deceleration is greater in the first direction than a first threshold value, or when the second deceleration is greater in the second direction than a second threshold value, and the judgment device performs at least one of setting for shifting the first threshold value in a direction opposite to the first direction and setting for shifting the second threshold value in a direction opposite to the second direction, when a second-deceleration change rate which is a change amount in the second deceleration per unit time becomes greater in the second direction than a change-rate threshold value.

According to the first aspect of the present invention, in a stage where the second-deceleration change rate is growing larger and the tendency of the rear wheel lift is increasing rapidly, it is possible to shift at least one of the first threshold value and the second threshold value toward a side where the judgment on the tendency of the rear wheel lift is made easily. For this reason, it is possible to make the judgment on the tendency of the rear wheel lift quickly.

According to a second aspect of the present invention, in addition to the first aspect, there is provided the vehicle rear wheel lift tendency judgment device further comprising a speed-in-traveling-direction obtaining device for obtaining a traveling-direction speed of the vehicle, and wherein when the traveling-direction speed becomes greater than a speed threshold value, the judgment device performs setting for shifting the second threshold value in the second direction.

According to the second aspect of the present invention, when an increase in the speed in the traveling direction makes travel resistance become larger and load for inhibiting the rear wheel lift becomes gradually larger on the vehicle, it is possible to shift the second threshold value toward a side where the judgment on the tendency of the rear wheel lift is made less easily. For this reason, it is possible to make the judgment on the tendency of the rear wheel lift quickly and accurately.

According to a third aspect of the present invention, in addition to the second aspect, when the second-deceleration change rate becomes greater in the second direction than the change-rate threshold value, the judgment device performs the setting for shifting the second threshold value in the direction opposite to the second direction regardless of the traveling-direction speed.

According to the third aspect of the present invention, even when the increase in the speed in the traveling direction makes the travel resistance become larger and the load for inhibiting the rear wheel lift becomes gradually larger on the vehicle, the second threshold value is shifted toward the side where the judgment on the tendency of the rear wheel lift is made easily in the stage where the second-deceleration change rate is growing larger and the tendency of the rear wheel lift is increasing rapidly. For this reason, it is possible to make the judgment on the tendency of the rear wheel lift quickly and accurately.

According to a fourth aspect of the present invention, in addition to any one of the first to third aspects, the judgment device performs the setting for shifting the first threshold value in the direction opposite to the first direction so that the first deceleration comes closer to the first threshold value in the first direction as the second deceleration comes closer to the second threshold value in the second direction.

According to the fourth aspect of the present invention, as the second deceleration becomes greater, the first threshold value is more shifted toward the side where the judgment on the tendency of the rear wheel lift is made easily. For this reason, it is possible to make the judgment on the tendency of the rear wheel lift quickly and accurately.

According to a fifth aspect of the present invention, in addition to any one of the first to third aspects, the vehicle is a two-wheeled motor vehicle, and an acceleration sensor for detecting an acceleration of the vehicle is housed right under a seat on which a driver gets seated, or inside a cover disposed in a rear of the seat.

According to the fifth aspect of the present invention, it is suitable for the acceleration sensor to be disposed in a place offset from the center of gravity of the vehicle in the direction of becoming farther from the ground contact point.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
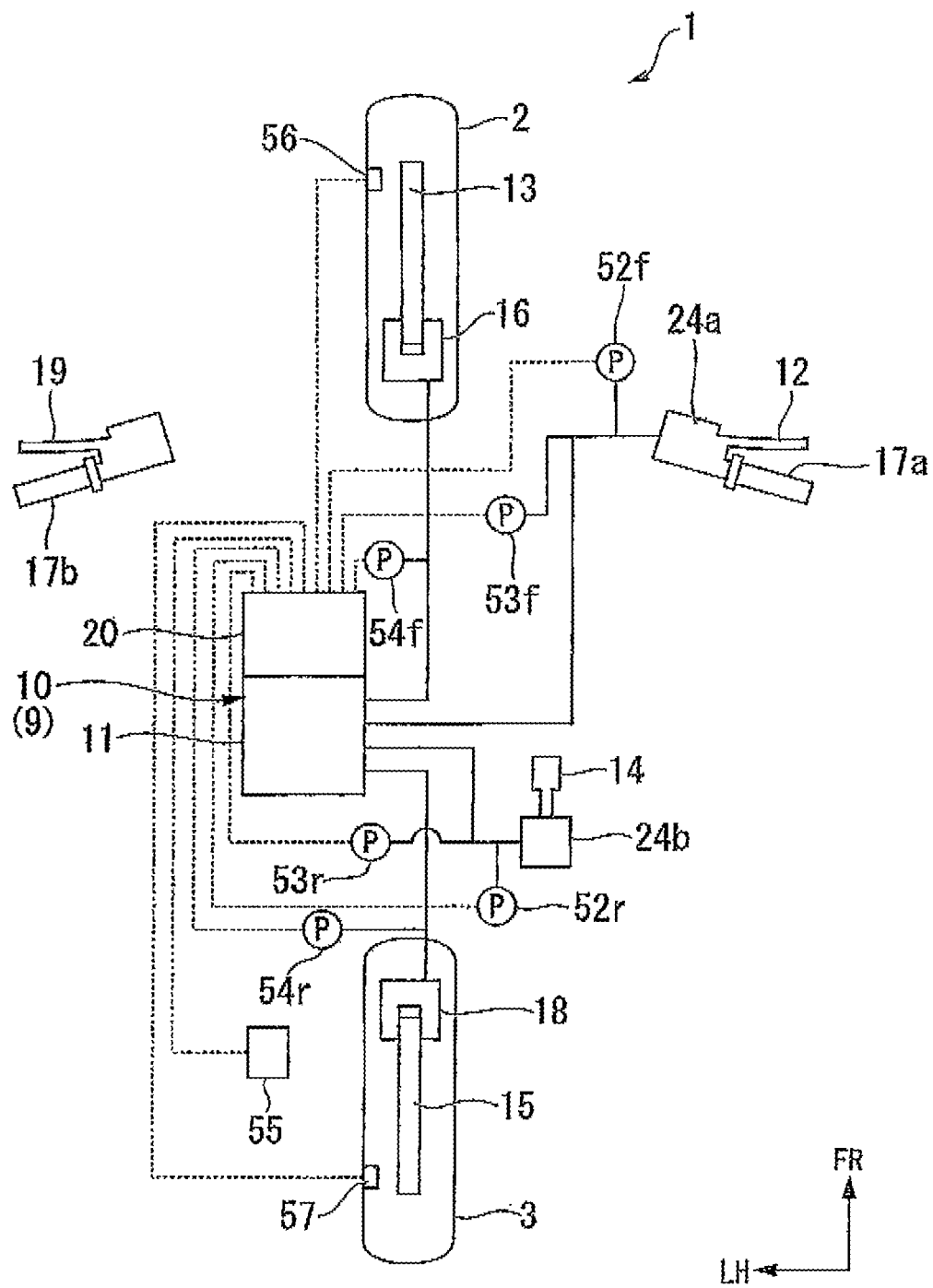
FIG. 1 is a configuration diagram of a two-wheeled motor vehicle which is equipped with a brake control system including a vehicle rear wheel lift tendency judgment device of an embodiment of the present invention.

Referring to the drawings, descriptions will be hereinbelow provided for an embodiment of the present invention. It should be noted that frontward, rearward, leftward, rightward, etc. directions in the following descriptions are the same directions as seen from a vehicle unless otherwise indicated. Arrows FR, LH, UP respectively indicating the frontward, leftward and upward directions from the vehicle are shown in some of the drawings which will be used for the following descriptions.

Descriptions will be hereinbelow provided showing a two-wheeled motor vehicle as an example of the vehicle. It should be noted that the vehicle of the present invention encompasses, for example, a three-wheeled motor vehicle with a configuration of one wheel in the front and two wheels in the rear, or with a configuration of two wheels in the front and one wheel in the rear, an all-terrain vehicle (ATV), and the like.

FIG. 1 is a configuration diagram of a two-wheeled motor vehicle 1 (the vehicle) which is equipped with a brake control system 10 including a vehicle rear wheel lift tendency judgment device 9 of an embodiment of the present invention. The two-wheeled motor vehicle 1 will be hereinafter referred to as the vehicle from time to time.

The brake control system 10 is an apparatus which is installed in various two-wheeled motor vehicles, and is configured to apply predetermined braking force to the vehicle by controlling drives of a front-wheel brake caliper 16 and a rear-wheel brake caliper 18 in response to operation of a brake lever 12 and a brake pedal 14, respectively, by a driver (a rider).

As shown in FIG. 1, the brake control system 10 includes: a fluid pressure unit 11 provided with fluid passages (passages of a brake fluid) and various parts; and a controller 20 for controlling the various parts inside the fluid pressure unit 11. It should be noted that in FIG. 1, reference numerals 17a, 17b and 19 denote right and left grips and a clutch lever, respectively.

As a front wheel system, front-wheel pressure sensors 52f, 53f, 54f and a front wheel speed sensor 56 are connected to the controller 20. The front-wheel pressure sensor 52f detects a brake fluid pressure which is produced by a first master cylinder 24a. The front-wheel pressure sensor 53f detects a fluid pressure inside the corresponding fluid passage. The front-wheel pressure sensor 54f detects a fluid pressure which is applied to the front-wheel brake caliper 16. The front wheel speed sensor 56 detects a wheel speed of a front wheel 2. Meanwhile, rear-wheel pressure sensors 52r, 53r, 54r and a rear wheel speed sensor 57 are connected to the controller 20. The rear-wheel pressure sensor 52r detects a brake fluid pressure which is produced by a second master cylinder 24b. The rear-wheel pressure sensor 53r detects a fluid pressure inside the corresponding fluid passage. The rear-wheel pressure sensor 54r detects a fluid pressure which is applied to the rear-wheel brake caliper 18. The rear wheel speed sensor 57 detects a wheel speed of a rear wheel 3. Furthermore, an acceleration sensor 55 for detecting an acceleration of the two-wheeled motor vehicle 1 is connected to the controller 20.

Figure 6:
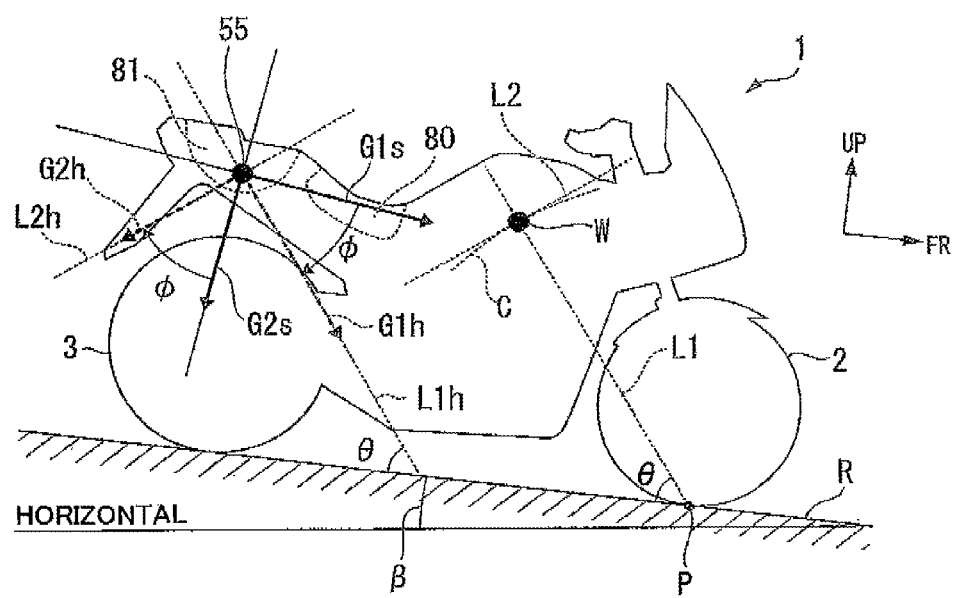
FIG. 6 is a side view of the two-wheeled motor vehicle, which shows a relationship between an acceleration sensor and a center of gravity of the vehicle.

The acceleration sensor 55 is disposed in a vehicle rear section of the two-wheeled motor vehicle 1 (see FIG. 6). To put it concretely, the acceleration sensor 55 is housed inside a cover 81 disposed in a rear of a seat 80 on which the driver gets seated. The acceleration sensor 55 detects an acceleration G1s of the vehicle in a front-rear direction, and an acceleration G2s of the vehicle in a gravitational direction. In this respect, a coordinate axis of the acceleration G1s inclines obliquely forward downward with respect to a horizontal direction when the two-wheeled motor vehicle 1 is on a horizontal road surface, while a coordinate axis of the acceleration G2s inclines obliquely upward forward with respect to a vertical direction.

It should be noted that the installation position of the acceleration sensor 55, the coordinate axis of the acceleration G1s, and the coordinate axis of the acceleration G2s may be set arbitrarily. For example, the acceleration sensor 55 may be installed right under the seat 80.

The controller 20 includes a CPU, a RAM, a ROM, input circuits, and output circuits, for example. The controller 20 performs control operation by carrying out various arithmetic processes on the basis of: inputs from the front-wheel pressure sensors 52f to 54f, the front wheel speed sensor 56, the rear-wheel pressure sensors 52r to 54r, and the rear wheel speed sensor 57; and programs and data stored in the ROM.

The front-wheel brake caliper 16 converts the brake fluid pressure, which is produced by the first master cylinder 24a or the brake control system 10, into application force of a front wheel brake 13 provided to the front wheel 2. The rear-wheel brake caliper 18 converts the brake fluid pressure, which is produced by the second master cylinder 24b or the brake control system 10, into application force of a rear wheel brake 15 provided to the rear wheel 3. The front-wheel brake caliper 16 and the rear-wheel brake caliper 18 are connected to the fluid pressure unit 11 via their respective pipes.

Figure 2:
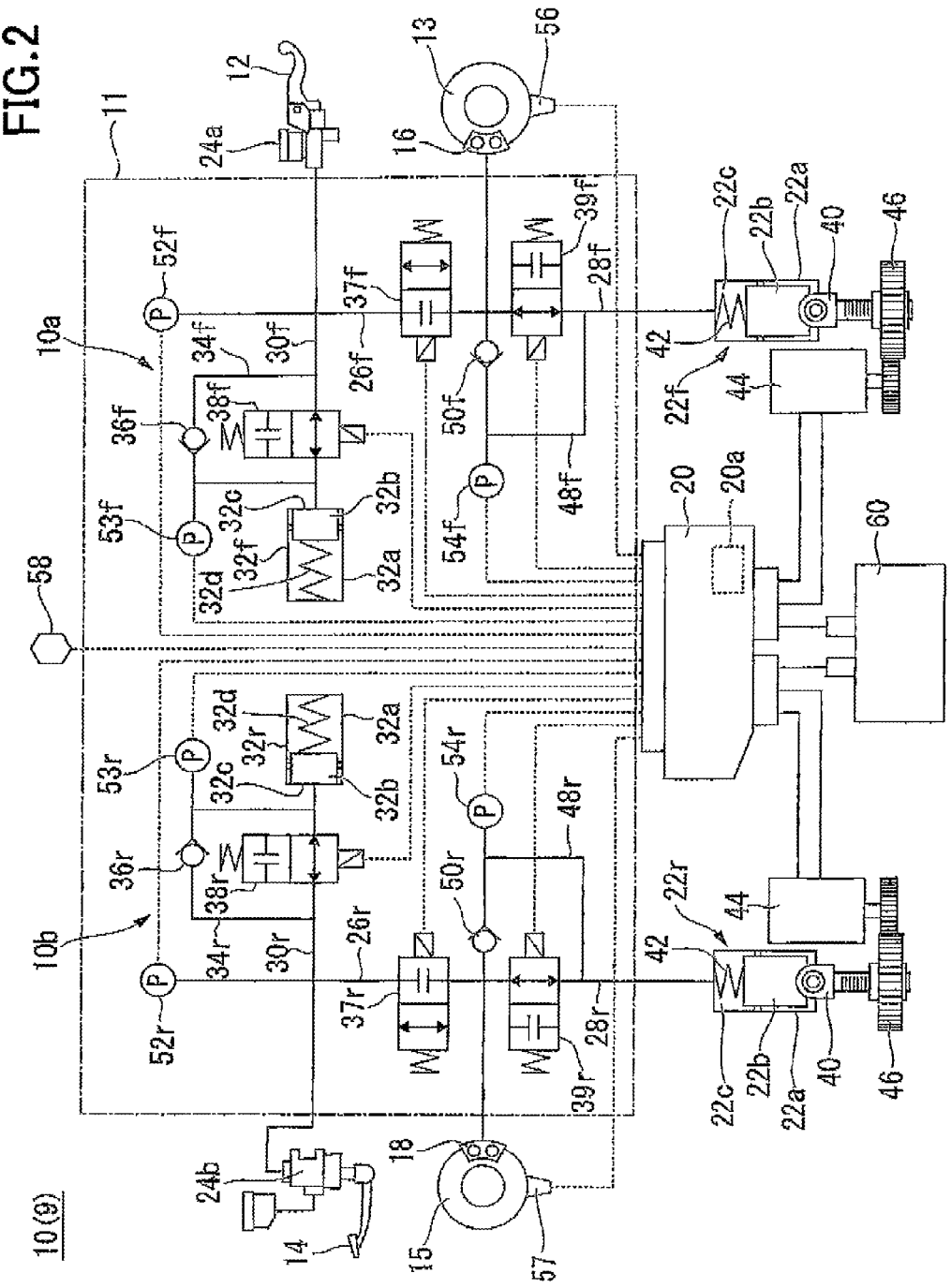
FIG. 2 is a configuration diagram of the brake control system.

FIG. 2 is a configuration diagram of the brake control system 10.

As shown in FIG. 2, the brake control system 10 is formed from a front-wheel brake circuit 10a and a rear-wheel brake circuit 10b which are mutually independent and linked by the controller 20. The fluid pressure unit 11 of the brake control system 10 is connected to the first master cylinder 24a, the second master cylinder 24b, the front wheel brake 13, and the rear wheel brake 15. The fluid pressure unit 11 includes front-wheel solenoid valves 37f to 39f, front-wheel check valves 36f, 50f, rear-wheel solenoid valves 37r to 39r, rear-wheel check valves 36r, 50r, and the like which are installed in the fluid passages.

In the brake control system 10, the brake application by use of the brake lever 12, which is a front-wheel brake manipulation unit, is performed via the front-wheel brake circuit 10a, while the brake application by use of the brake pedal 14, which is a rear-wheel brake manipulation unit, is performed via the rear-wheel brake circuit 10b.

The brake control system 10 uses a by-wire method (a brake-by-wire method) for the front-wheel brake circuit 10a and the rear-wheel brake circuit 10b. The by-wire method for the brake control system 10 is that in which: amounts of manipulations of the brake lever 12 and the brake pedal 14 (the fluid pressures in the embodiment) are electrically detected; and the fluid pressures produced by fluid pressure modulators 22f, 22r on the basis of the detection values make the front-wheel and rear-wheel brake calipers 16, 18 produce predetermined braking forces.

Configurations of the respective front-wheel and rear-wheel brake circuits 10a, 10b in the brake control system 10 are substantially the same. For this reason, the following descriptions will be provided basically for the front-wheel brake circuit 10a, and duplicated descriptions will be omitted from the rear-wheel brake circuit 10b.

The brake control system 10 uses a combined brake system (CBS) designed such that once one of the front-wheel and rear-wheel brake manipulation units, for example, the brake lever 12 which is the front-wheel brake manipulation unit, is manipulated, the CBS is capable of performing coordinated control on the drives of the respective front-wheel and rear-wheel brake calipers 16, 18, which are front-wheel and rear-wheel braking parts, under the control of the controller 20.

To put it concretely, for example, once the brake lever 12 is manipulated, the front-wheel brake circuit 10a applies a predetermined fluid pressure to the front-wheel brake caliper 16 by controlling the drive of the front-wheel fluid pressure modulator 22f using the by-wire method on the basis of the fluid pressure of the first master cylinder 24a under the control of the controller 20. In addition, the rear-wheel brake circuit 10b applies a predetermined fluid pressure to the rear-wheel brake caliper 18 by controlling the drive of the rear-wheel fluid pressure modulator 22r in coordination.

In the front-wheel brake circuit 10a, the first master cylinder 24a actuated by the brake lever 12, and the front-wheel brake caliper 16 corresponding to the first master cylinder 24a are connected together via a front-wheel main passage 26f. In the front-wheel brake circuit 10a, the front-wheel fluid pressure modulator 22f is confluently connected to an intermediate portion of the front-wheel main passage 26f via a front-wheel plumbing passage 28f.

The first front-wheel solenoid valve 37f for communicating and shutting off the first master cylinder 24a and the front-wheel brake caliper 16 is provided in a part of the front-wheel main passage 26f which is situated closer to the first master cylinder 24a from a position of confluent connection between the front-wheel main passage 26f and the front-wheel plumbing passage 28f.

A front-wheel branch passage 30f is connected to the front-wheel main passage 26f. A front-wheel fluid loss simulator 32f is connected to the front-wheel branch passage 30f via the second front-wheel solenoid valve 38f. The front-wheel fluid loss simulator 32f plays a function of applying a simulated fluid pressure reaction force depending on the amount of manipulation of the brake lever 12 to the first master cylinder 24a when the first front-wheel solenoid valve 37f closes the front-wheel main passage 26f (when the by-wire system is in operation). When the front-wheel fluid loss simulator 32f applies the reaction force to the first master cylinder 24a, the second front-wheel solenoid valve 38f opens the front-wheel branch passage 30f, and thereby makes the front-wheel fluid loss simulator 32f communicate with the first master cylinder 24a.

In the front-wheel fluid loss simulator 32f, a piston 32b is housed in a cylinder 32a so as to be freely movable backward and forward, and a fluid chamber 32c for receiving a hydraulic fluid (a brake fluid) flowing in from the first master cylinder 24a is formed between the cylinder 32a and a tip end surface of the piston 32b. A repulsion spring 32d is provided to a back side (a back pressure side) of the piston 32b. The repulsion spring 32d is formed, for example, by serially placing a coil spring and a resin spring which are different from each other in characteristics. The repulsion spring 32d is capable of providing a reaction force whose characteristics includes: a slow rise when the piston 32b starts to move backward or forward, or when the brake lever 12 is manipulated; and a steep rise at a stroke end.

The front-wheel branch passage 30f is provided with a front-wheel bypass passage 34f bypassing the second front-wheel solenoid valve 38f. The front-wheel bypass passage 34f is provided with a front-wheel check valve 36f for allowing only a flow of the hydraulic fluid from the front-wheel fluid loss simulator 32f toward the first master cylinder 24a.

The front-wheel fluid pressure modulator 22f includes: a cam mechanism 40 for pressing a piston 22b provided in a cylinder 22a toward a fluid pressure chamber 22c formed between the cylinder 22a and a tip end surface of the piston 22b; a return spring 42 for always biasing the piston 22b toward the cam mechanism 40; an electric motor 44 for actuating the cam mechanism 40; and a gear mechanism 46 for transmitting driving force of the electric motor 44 to the cam mechanism 40. The fluid pressure chamber 22c is connected to the front-wheel plumbing passage 28f so as to communicate with the front-wheel plumbing passage 28f.

The front-wheel fluid pressure modulator 22f is capable of pressing the piston 22b by using an initial position of the cylinder 22a as a reference when the cam mechanism 40 is driven by the electric motor 44 via the gear mechanism 46, or returning the piston 22b by using the return spring 42. In other words, the front-wheel fluid pressure modulator 22f is capable of increasing and decreasing a braking pressure of the front-wheel brake caliper 16 by increasing and decreasing a pressure (a fluid pressure) inside the fluid pressure chamber 22c.

The electric motor 44 adjusts, for example, an electric current value which is determined by PWM (Pulse Width Modulation) control on the basis of an input duty ratio (obtained by dividing ON time by a sum of ON time and OFF time). Thereby, the electric motor 44 is capable of electrically adjusting a position of the piston 22b which is determined by a rotational position of the cam mechanism 40. Thus, the electric motor 44 is capable of adjusting the pressure inside the fluid pressure chamber 22c precisely and easily. Incidentally, the drive of the electric motor 44 is controlled by a motor driver 20a provided to the controller 20.

The front-wheel plumbing passage 28f is provided with the third front-wheel solenoid valve 39f. The front-wheel plumbing passage 28f is provided with a front-wheel bypass passage 48f bypassing the third front-wheel solenoid valve 39f. The front-wheel bypass passage 48f is provided with the front-wheel check valve 50f for allowing only a flow of the hydraulic fluid from the front-wheel fluid pressure modulator 22f to the front-wheel brake caliper 16.

The front-wheel brake circuit 10a is provided with the front-wheel pressure sensors 52f to 54f. The front-wheel pressure sensor 52f is disposed on an input side which is a first master cylinder 24a side of the first front-wheel solenoid valve 37f. The front-wheel pressure sensor 53f is disposed on an opposite side of the second front-wheel solenoid valve 38f from the first master cylinder 24a. The front-wheel pressure sensors 54f is disposed on an output side which is a front-wheel brake caliper 16 side of the first front-wheel solenoid valve 37f.

A cam shaft of the cam mechanism 40 is provided with an angle sensor for feedback of angle information, albeit not illustrated. The front wheel speed sensor 56 for detecting the front wheel speed is provided near the front-wheel brake caliper 16. The rear wheel speed sensor 57 for detecting the rear wheel speed is provided near the rear-wheel brake caliper 18.

The brake control system 10 is provided with a mode selector switch 58 for switching a control mode by manual operation of the driver. When the driver prefers the CBS control, the driver can selects the CBS control by switching the mode selector switch 58. The following descriptions will be provided for how control is performed when the CBS control is selected.

While receiving power supply from a battery 60, the controller 20 controls opening and closing of the first solenoid valves 37f, 37r, the second solenoid valves 38f, 38r, and the third solenoid valves 39f, 39r on the basis of things such as detection signals from the front-wheel pressure sensors 52f to 54f, the rear-wheel pressure sensors 52r to 54r, as well as detection signals from the front wheel speed sensor 56, the rear wheel speed sensor 57, the angle sensor (whose illustration is omitted), the acceleration sensor 55, and the like, and also controls the drive of the electric motor 44 (signal lines are indicated with broken lines in FIG. 2).

To put it concretely, once one of the brake manipulation units, for example the brake lever 12, is manipulated, the front and rear wheel speeds at the time of the manipulation are inputted into the controller 20 from the respective front and rear wheel speed sensors 56, 57, as well as information on the amounts of brake manipulations and the like is inputted into the controller 20 from the pressure sensors 52f, 52r. Subsequently, under an instruction from the controller 20, the front-wheel and rear-wheel brake circuits 10a, 10b close the first solenoid valves 37f, 37r, and concurrently open the second solenoid valves 38f, 38r and the third solenoid valves 39f, 39r. In other words, in the main passages 26f, 26r, the first solenoid valves 37f, 37r are held closed, as well as the second solenoid valves 38f, 38r and the third solenoid valves 39f, 39r are held open. Thereby, the fluid pressure modulators 22f, 22r respectively supply the front-wheel and rear-wheel brake calipers 16, 18 with the fluid pressures depending on the vehicle driving conditions, and the brake manipulations. In this manner, the front and rear wheels produce the coordinated braking forces on the basis of the manipulation of the brake lever 12.

It should be noted that the brake control system 10 switches the brake circuit to the various control modes depending on predetermined conditions. For example, if a traveling-direction speed $V_B$ (a traveling speed of the vehicle in the traveling direction) is not greater than a predetermined value M (M=6 km/h, for example) (if $V_B \leq M$), the front-wheel brake circuit 10a opens the first front-wheel solenoid valve 37f, and concurrently closes the second and third front-wheel solenoid valves 38f, 39f. In other words, the first front-wheel solenoid valve 37f is held open in the front-wheel main passage 26f, while the second and third front-wheel solenoid valves 38f, 39f are held closed. This establishes a so-called conventional brake circuit (a first mode) in which the first master cylinder 24a and the front-wheel brake caliper 16 are directly connected together via the fluid passage. In the first mode, the braking force is produced on the basis of the manipulation of the brake lever 12.

On the other hand, regardless of the traveling-direction speed $V_B$, if a fluid pressure Ps detected by the front-wheel pressure sensor 53f is not less than a predetermined value N above a reference fluid pressure (if Ps≥N), the front-wheel brake circuit 10a closes the first front-wheel solenoid valve 37f, and concurrently opens the second and third front-wheel solenoid valves 38f, 39f. In other words, the first front-wheel solenoid valve 37f is held closed in the front-wheel main passage 26f, while the second and third front-wheel solenoid valves 38f, 39f are held opened. This establishes a so-called by-wire (brake-by-wire) brake circuit (a second mode) in which: the amount of manipulation of the brake lever 12 (the fluid pressure in the embodiment) is electrically detected; and a fluid pressure produced by the front-wheel fluid pressure modulator 22f on the basis of the detected value makes the front-wheel brake caliper 16 produce a predetermined braking force.

In addition, if the traveling-direction speed $V_B$ exceeds the predetermined value M (M=6 km/h, for example) and the fluid pressure Ps detected by the front-wheel pressure sensor 53f is less than the predetermined value N (if $V_B$>M and Ps<N), the front-wheel brake circuit 10a opens the first and second front-wheel solenoid valves 37f, 38f, and concurrently closes the third front-wheel solenoid valve 39f. In other words, the first front-wheel solenoid valve 37f is held open in the front-wheel main passages 26f, while the second front-wheel solenoid valve 38f is held open and the third front-wheel solenoid valve 39f is held closed. This state is a so-called input standby mode (a third mode) in which the brake lever 12 is not manipulated.

Although the forgoing descriptions have been provided basically for the front-wheel brake circuit 10a, this is the case with the rear-wheel brake circuit 10b.

In this respect, the pressure sensors 53f, 53r detect the fluid pressures inside the fluid passages, and convert the detected fluid pressures into voltages, respectively. The voltages (hereinafter referred to as zero points) corresponding to the respective hydraulic pressures at the time of no manipulations may deviate from original ones because of influences of the temperature and the like. For this reason, the embodiment performs zero-point correction while in the third mode which is the so-called input standby mode.

Using FIGS. 3 and 4, descriptions will be hereinbelow provided for how the zero-point correction is carried out.

Figure 3:
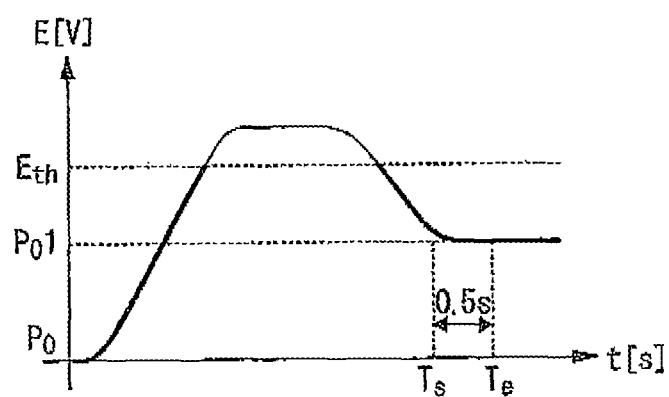
FIG. 3 is a diagram showing an example of a relationship between time t and voltage E into which a pressure sensor converts its corresponding brake application force.

FIG. 3 is a diagram showing an example of a relationship between time t and voltage E into which any one of the pressure sensors 53f, 53r converts its corresponding brake application force. In FIG. 3, the horizontal axis represents the time t [s], while the vertical axis represents the voltage E [V]. In addition, reference numerals Eth, Po, Po1, Ts and Te respectively denote a threshold voltage, an original zero point (a zero point immediately before a current one), a new zero point (the current one), time at which measurement of a predetermined length of time starts, and time at which the measurement of the predetermined length of time ends.

Figure 4:
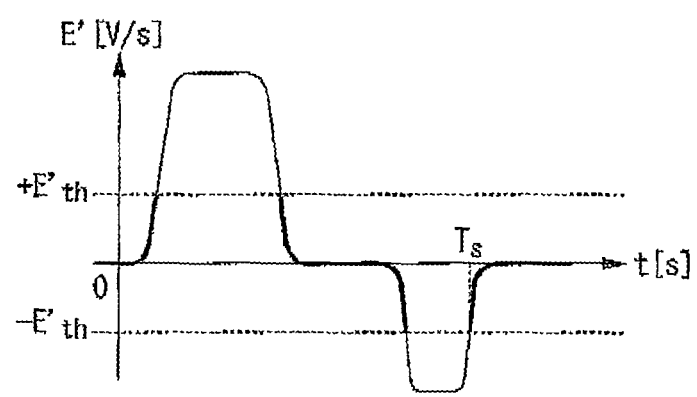
FIG. 4 is a diagram showing an example of a relationship between time t and a voltage change rate E' which is a rate of change per unit time in the voltage E into which the pressure sensor converts its corresponding brake application force.

FIG. 4 is a diagram showing an example of a relationship between time t and a voltage change rate E' which is a rate of change per unit time in the voltage E into which any one of the pressure sensors 53f, 53r converts its corresponding brake application force. In FIG. 4, the horizontal axis represents the time t [s], while the vertical axis represents the voltage change rate E' [V/s]. In addition, reference numerals +E'th and −E'th respectively denote a threshold-voltage change rate on the positive side and a threshold-voltage change rate on the negative side.

It should be noted that the horizontal axes in FIGS. 3 and 4 correspond to each other, and time intervals are the same between FIGS. 3 and 4.

As shown in FIG. 3, the voltage E changes over the time t. The zero point correction will be described using a case where, to put it concretely, the voltage E remains at the zero point Po for a slight length of time, thereafter increases in proportion to time, reaches a maximum value after slightly exceeding the threshold voltage Eth, remains at the maximum value for a certain length of time, subsequently decreases in proportion to time, and remains at a voltage between the zero point Po and the threshold voltage Eth for a certain length of time.

As shown in FIG. 4, in response to the change in the voltage E shown in FIG. 3, the voltage change rate E' changes over time. To put it concretely, the voltage change rate E' remains at zero (no voltage change) for the slight length of time, thereafter increases in proportion to time, reaches a maximum value after exceeding the threshold-voltage change rate +E'th on the positive side to a large extent, remains at the maximum value for a certain length of time, subsequently decreases in proportion to time, remains at zero for a certain time of length, decreases in proportion to time, reaches a minimum value after exceeding the threshold-voltage change rate −E'th on the negative side to a large extent, remains at the minimum value for a certain length of time, thereafter increases in proportion to time, and remains at zero for a certain length of time.

(1) If the voltage E is not greater than the threshold voltage Eth, and (2) if a condition in which the voltage change rate E' is not less than the threshold-voltage change rate −E'th on the negative side but not greater than the threshold-voltage change rate +E'th on the positive side lasts for the predetermined length of time (0.5 s, for example), the zero point correction is carried out by setting the new zero point at an average voltage during this predetermined length of time.

For example, bold-lined portions of the curve in FIG. 3 indicate that a criterion (1) is satisfied, and bold-lined portions of the curve in FIG. 4 indicate that a criterion (2) is satisfied. If the criteria (1) and (2) are satisfied at the same time and continue being satisfied for the predetermined length of time (0.5 s, for example) from the start of the measurement, the zero point correction is carried out by setting the new zero point Po1 at the average voltage from the measurement start time Ts through the measurement end time Te, namely during the predetermined length of time.

Note that it does not matter at all that instead of the average voltage, a predetermined representative value, median, or the like representing the length of time from the measurement start time Ts through the measurement end time Te is used to set the zero point Po1.

The zero point correction like this makes it possible for the pressure sensors 52f, 52r, 54f, 54r to estimate their respective fluid pressures from their detected voltages on the basis of the new zero point Po1, but not on the basis of the original zero point Po.

Figure 5:
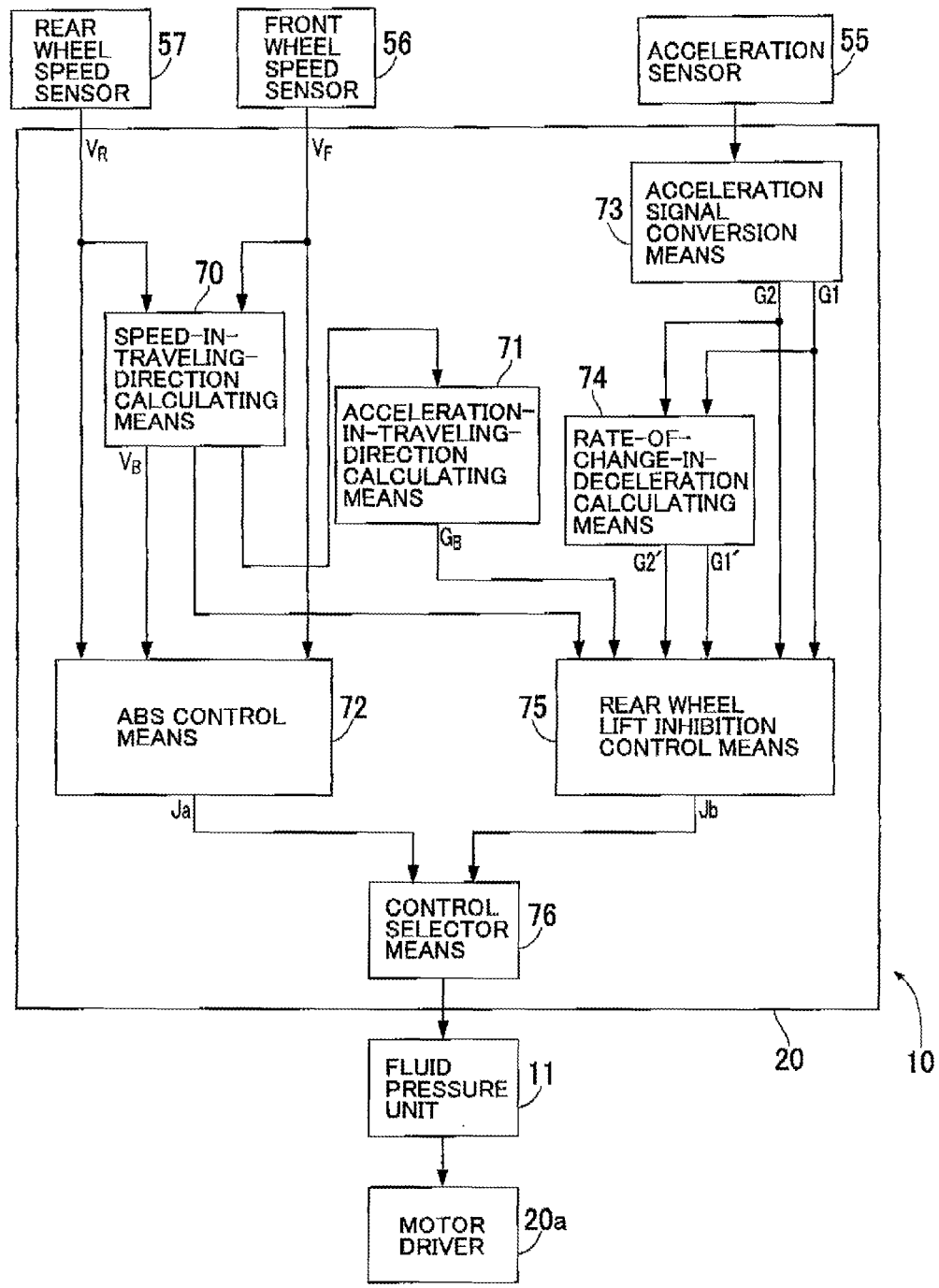
FIG. 5 is a block diagram of the brake control system.

FIG. 5 is a block diagram of the brake control system 10.

As shown in FIG. 5, the controller 20 constituting a part of the brake control system 10 includes: speed-in-traveling-direction calculating means 70; acceleration-in-traveling-direction calculating means 71; ABS control means 72; acceleration signal conversion means 73; rate-of-change-in-deceleration calculating means 74; rear wheel lift inhibition control means 75; and control selector means 76.

A front wheel speed $V_F$ detected by the front wheel speed sensor 56 is inputted into the speed-in-traveling-direction calculating means 70 and the ABS control means 72. A rear wheel speed $V_R$ detected by the rear wheel speed sensor 57 is inputted into the speed-in-traveling-direction calculating means 70 and the ABS control means 72.

On the basis of the front wheel speed $V_F$ or the rear wheel speed $V_R$, the speed-in-traveling-direction calculating means 70 (speed-in-traveling-direction obtaining means) calculates a traveling-direction speed $V_B$ which is a speed of the vehicle in the traveling direction. A publicly-known method may be used to calculate the traveling-direction speed $V_B$. For example, the traveling-direction speed $V_B$ is obtained using Equation (1) given below.

$$V_B = V_F \tag{1}$$

The obtained traveling-direction speed $V_B$ is inputted into the acceleration-in-traveling-direction calculating means 71, and the ABS control means 72, and the rear wheel lift inhibition control means 75.

On the basis of the traveling-direction speed $V_B$, the acceleration-in-traveling-direction calculating means 71 (acceleration-in-traveling-direction obtaining means) calculates a traveling-direction acceleration $G_B$ which is an acceleration of the vehicle in the traveling direction. A publicly-known method may be used to calculate the traveling-direction acceleration $G_B$. For example, the traveling-direction speed $V_B$ is stored and updated in each predetermined cycle, and the current traveling-direction acceleration $G_B$ is calculated on the basis of a differential between the traveling-direction speed $V_B$ obtained at the current cycle and the traveling-direction speed $V_B$ stored one or multiple cycles ago.

The calculated traveling-direction acceleration $G_B$ is inputted into the rear wheel lift inhibition control means 75.

On the basis of the front wheel speed $V_F$, the rear wheel speed $V_R$ and the traveling-direction speed $V_B$, the ABS control means 72 judges whether or not ABS (Antilock Brake System) control is needed for the front wheel brake 13 and the rear wheel brake 15. In other words, on the basis of the traveling-direction speed $V_B$ and a slip ratio, the ABS control means 72 judges whether or not the ABS control is needed for the front wheel brake 13 and the rear wheel brake 15. In this respect, the slip ratio is that obtained by dividing a difference between the traveling-direction speed $V_B$ and the wheel speed (the front wheel speed $V_F$ or the rear wheel speed $V_R$) by the traveling-direction speed $V_B$. For example, the slip ratio of the rear wheel is calculated by an expression of $(V_B-V_R)/V_B$.

If on the basis of the traveling-direction speed $V_B$ and the slip ratio, the ABS control means 72 judges that the ABS control is needed, the ABS control means 72 controls operations of the respective solenoid valves 37f to 39f, 37r to 39r and an amount of drive of the electric motor 44. Thereby, the ABS control means 72 performs the ABS control on the front and rear wheel brakes 13, 15, and inhibits the slips of the respective front and rear wheels 2, 3 when the brake is applied. Incidentally, the ABS control includes pressure reduction control, pressure retention control, and pressure augmentation control.

An ABS control signal Ja from the ABS control means 72 is inputted into the control selector means 76.

Figure 7:
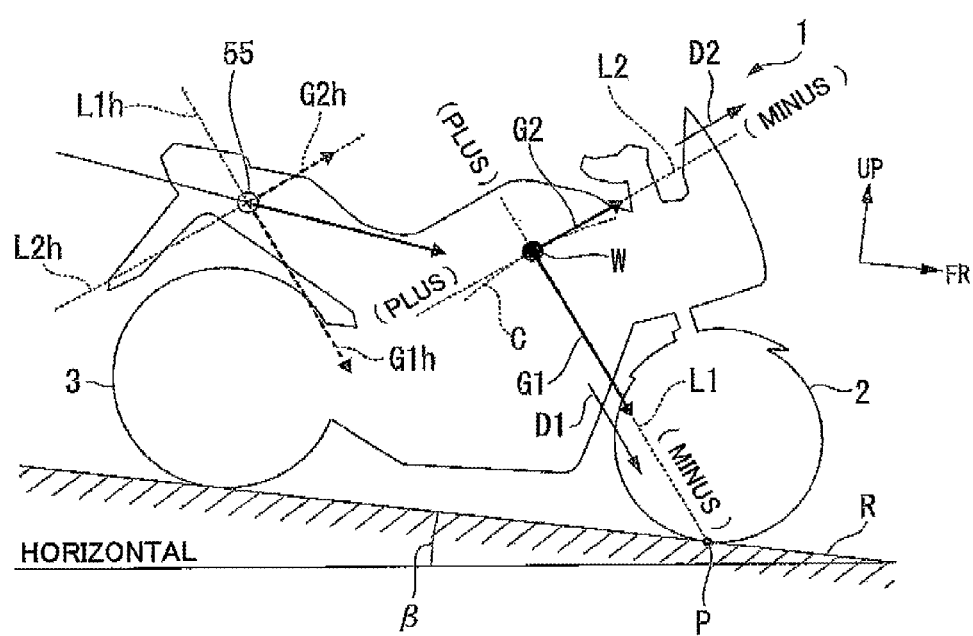
FIG. 7 is a side view of the two-wheeled motor vehicle, which shows accelerations acting on the center of gravity of the vehicle.
Figure 8:
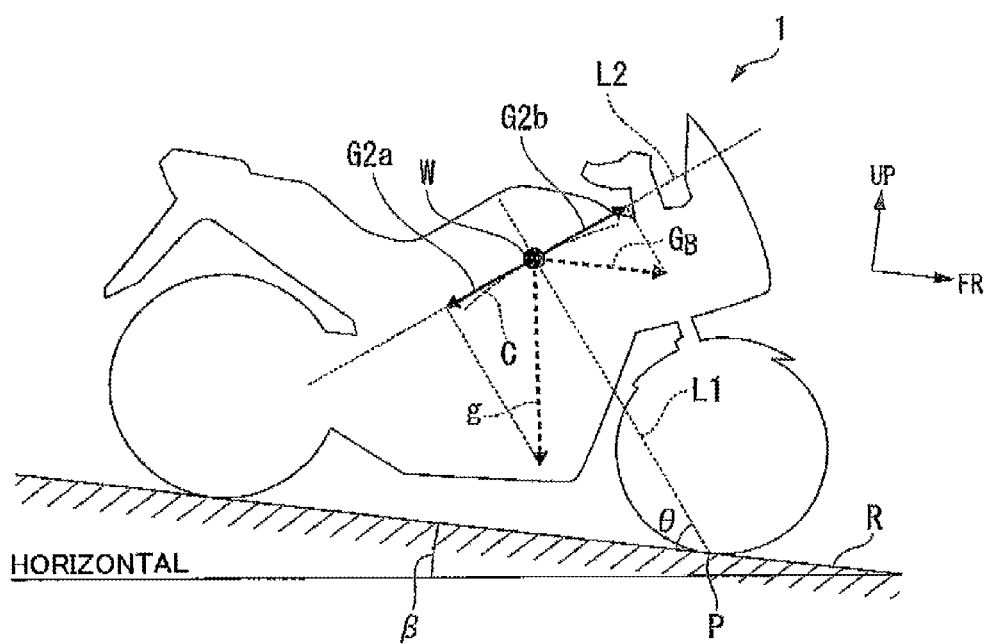
FIG. 8 is a side view of the two-wheeled motor vehicle, which shows components in a direction along a second straight line, respectively, of a gravitational acceleration and an acceleration in a traveling direction.

FIG. 6 is a side view of the two-wheeled motor vehicle 1, which shows a relationship between the acceleration sensor 55 and the center W of gravity of the vehicle. FIG. 7 is a side view of the two-wheeled motor vehicle 1, which shows accelerations acting on the center W of gravity of the vehicle. FIG. 8 is a side view of the two-wheeled motor vehicle 1, which shows acceleration components in a direction along a second straight line L2, respectively, of a gravitational acceleration g and the traveling-direction acceleration $G_B$.

As shown in FIG. 6, the acceleration signal conversion means 73 (deceleration obtaining means) obtains the acceleration G1s of the vehicle in the front-rear direction and the acceleration G2s of the vehicle in the gravitational direction which are detected by the acceleration sensor 55. In addition, as shown in FIG. 7, the acceleration signal conversion means 73 (deceleration obtaining means) converts the accelerations G1s, G2s into accelerations G1h, G2h along coordinate axes L1h, L2h in parallel to coordinate axes L1, L2 of decelerations G1, G2 passing the center W of gravity of the vehicle, respectively.

The embodiment uses the thus-converted accelerations G1h, G2h as the decelerations G1, G2 to be obtained at the center W of gravity of the vehicle.

It should be noted that the coordinate axis L1h of the acceleration G1h is in parallel to a first straight line L1 joining the center W of gravity of the vehicle and a ground contact point P of the front wheel 2. The coordinate axis L2h of the acceleration G2h is in parallel to the second straight line L2 which passes the center W of gravity of the vehicle and is orthogonal to the first straight line L1 (a tangent to a circle C, which is formed around the ground contact point P of the front wheel 2, at a point of intersection between the first straight line L1 and the circle C). For example, the accelerations G1h, G2h are calculated using Equations (2) and (3) given below.

$$G1h = G1s \times \cos\phi + G2s \times \sin\phi \tag{2}$$

$$G2h = G2s \times \sin\phi + G2s \times \cos\phi \tag{3}$$

The calculated accelerations G1h, G2h are substituted for the decelerations G1, G2 on the center W of gravity of the vehicle, and are inputted into the rate-of-change-in-deceleration calculating means 74 and the rear wheel lift inhibition control means 75 (see FIG. 5).

As shown in FIG. 5, on the basis of the decelerations G1, G2, the rate-of-change-in-deceleration calculating means 74 calculates deceleration change rates G1', G2'. A publicly-known method may be used to calculate the deceleration change rates G1', G2'. For example, the decelerations G1, G2 are stored and updated in each predetermined cycle, and the current deceleration change rates G1', G2' are calculated on the basis of differentials between the decelerations G1, G2 obtained at the current cycle and the decelerations G1, G2 stored one or multiple cycles ago.

The calculated deceleration change rates G1', G2' are inputted into the rear wheel lift inhibition control means 75.

As shown in FIG. 7, a first direction D1 represents a direction (a negative direction) which extends along the first straight line L1, and which points from the center W of gravity of the vehicle to the ground contact point P of the front wheel 2; and a second direction D2 represents a direction (a negative direction) which extends along the second straight line L2, and in which the vehicle turns forward around the ground contact point P from the center W of gravity of the vehicle. The first deceleration G1 is a component in the first direction D1 of an acceleration acting on the center W of gravity. The second deceleration G2 is a component in the second direction D2 of the acceleration acting on the center W of gravity.

During the deceleration of the vehicle, the first deceleration G1 acts along the first straight line L1, and the second deceleration G2 acts along the second straight line L2.

In this respect, as shown in FIG. 8, the second deceleration G2 is a resultant of a component G2a in the direction along the second straight line L2 of the gravitational acceleration g, and a component G2b in the direction along the second straight line L2 of the traveling-direction acceleration $G_B$. For example, the second deceleration G2 is calculated using Equation (4) given below.

$$G2 = G2a + G2b \tag{4}$$

When Equation (4) given above suggests that the second deceleration G2 causes an acceleration in the direction of the forward turn around the ground contact point P, there is a tendency of the rear wheel lift.

Figure 9:
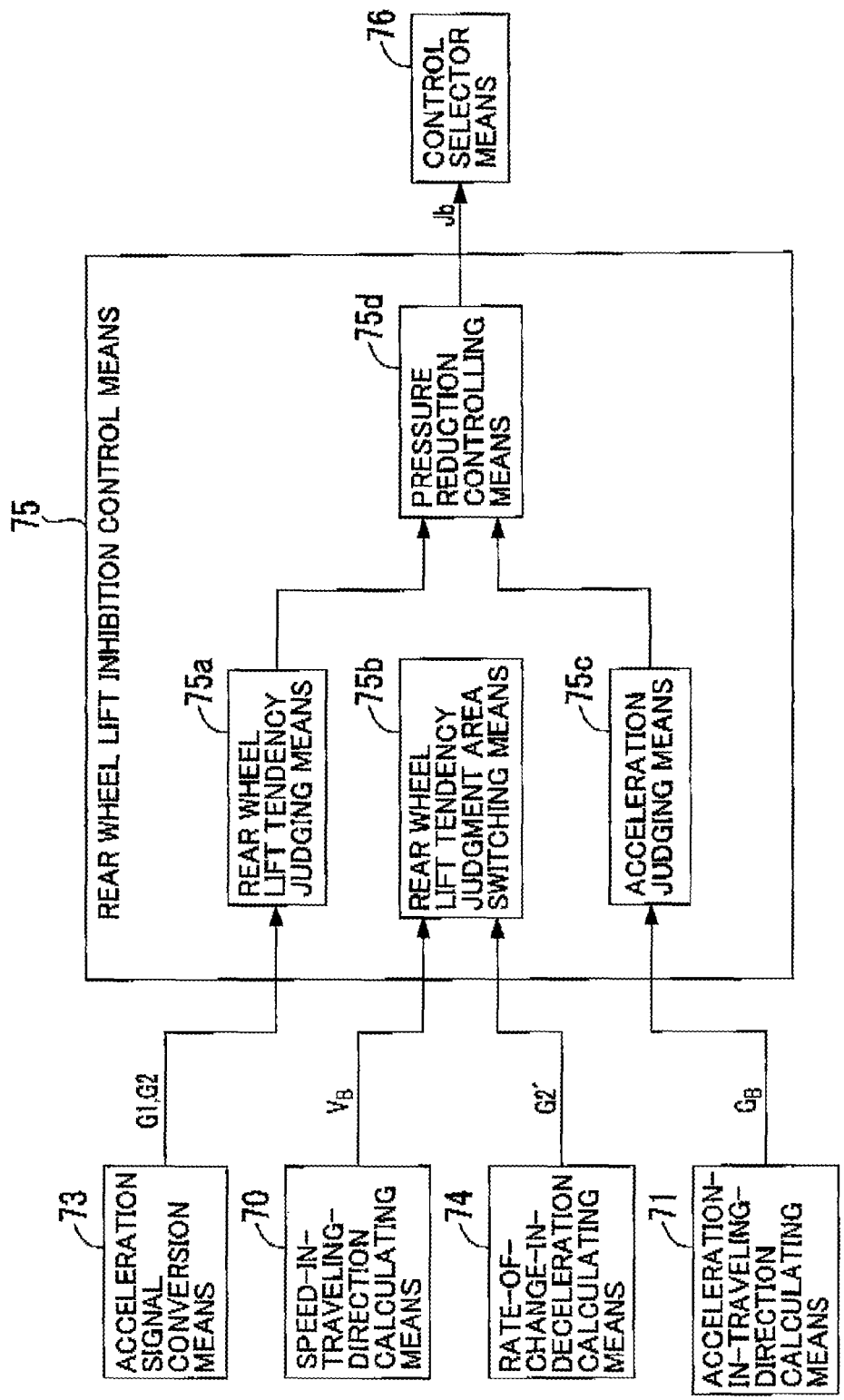
FIG. 9 is a block diagram showing details of a rear wheel lift inhibition control means in the brake control system.

FIG. 9 is a block diagram showing details of the rear wheel lift inhibition control means 75.

As shown in FIG. 9, the rear wheel lift inhibition control means 75 includes rear wheel lift tendency judging means 75a, rear wheel lift tendency judgment area switching means 75b, acceleration judging means 75c, and pressure reduction controlling means 75d.

The rear wheel lift tendency judging means 75a makes a judgment on the tendency of the rear wheel lift on the basis of the decelerations G1, G2 and a result of switching by the rear wheel lift tendency judgment area switching means 75b. When there is a tendency of the rear wheel lift, the rear wheel lift tendency judging means 75a performs the pressure reduction control on the front wheel brake 13 in order to inhibit the rear wheel lift.

Figure 10:
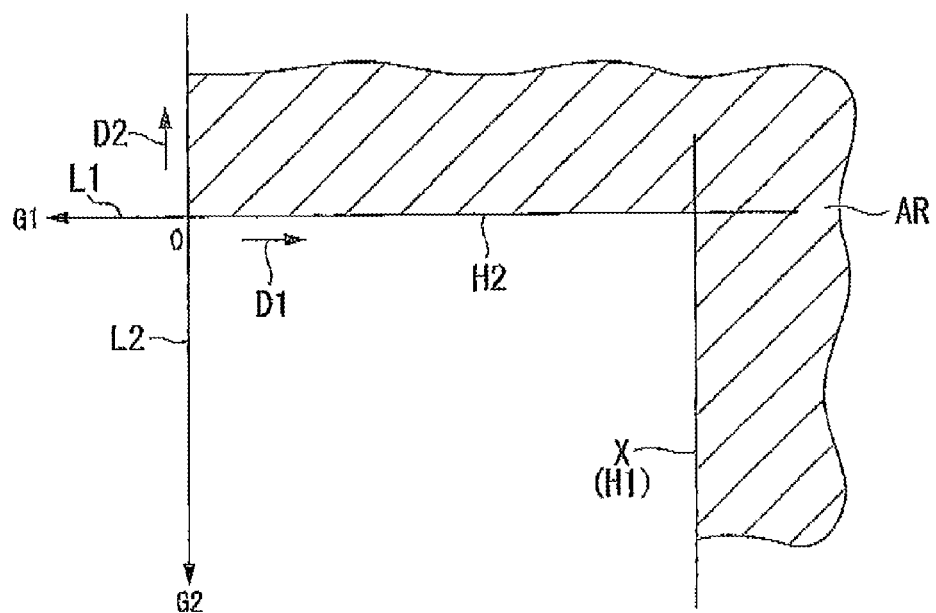
FIG. 10 is a schematic diagram showing a rear wheel lift tendency judgment area.

FIG. 10 is a schematic diagram showing a rear wheel lift tendency judgment area AR.

It should be noted that in FIG. 10, the horizontal axis corresponds to the first straight line L1, while the vertical axis corresponds to the second straight line L2. In addition, the negative side on the horizontal axis corresponds to the first direction D1, while the negative side on the vertical axis corresponds to the second direction D2.

When as shown in FIG. 10, the decelerations G1, G2 falls within the rear wheel lift tendency judgment area AR hatched in the drawing, the rear wheel lift tendency judging means 75a judges that there is a tendency of the rear wheel lift, and performs the pressure reduction control in order to inhibit the rear wheel lift.

The rear wheel lift tendency judgment area AR is set including: an area in which the first deceleration G1 is less than zero (G1<0) and the second deceleration G2 is less than zero (G2<0); and an area where the first deceleration G1 is not greater than a predetermined value X (X<0). In this respect, the reason why the rear wheel lift tendency judgment area AR does not include an area where the first deceleration G1 is not less than 0 (G1≥0) is that because no load acts on the front fork of the front wheel 2, there is no tendency of the rear wheel lift.

When the second deceleration G2 is less than 0, the absolute value of the component G2b of the traveling-direction acceleration $G_B$ is greater than the component G2a of the gravitational acceleration g. For this reason, an angular acceleration in the direction of the forward turn around the ground contact point P occurs, and the rear wheel lift is likely to occur. The predetermined value X is set on the assumption that a load to largely contract the front fork of the front wheel 2 acts on the front wheel 2. If the first deceleration G1 is less than the predetermined value X, the second deceleration G2 subsequently becomes more likely to largely change to a negative value, and the rear wheel life is therefore more likely to occur.

In this respect, the predetermined value X is defined as a first threshold value H1, and a value which makes the second deceleration G2 equal to 0 is defined as a second threshold value H2.

The rear wheel lift tendency judging means 75a judges that the rear wheel 3 is likely to get lifted, if the first deceleration G1 is greater in the first direction D1 than the first threshold value H1, or if the second deceleration G2 is greater in the second direction D2 than the second threshold value H2.

Returning to FIG. 9, a result of the judgment by the rear wheel lift tendency judging means 75a is inputted into the pressure reduction controlling means 75d.

The rear wheel lift tendency judgment area switching means 75b switches the rear wheel lift tendency judgment area AR on the basis of a second-deceleration change rate G2' and the traveling-direction speed $V_B$. Using FIGS. 11 to 18, descriptions will be hereinbelow provided for how the rear wheel lift tendency judgment area switching means 75b switches the rear wheel lift tendency judgment area AR.

Figure 11:
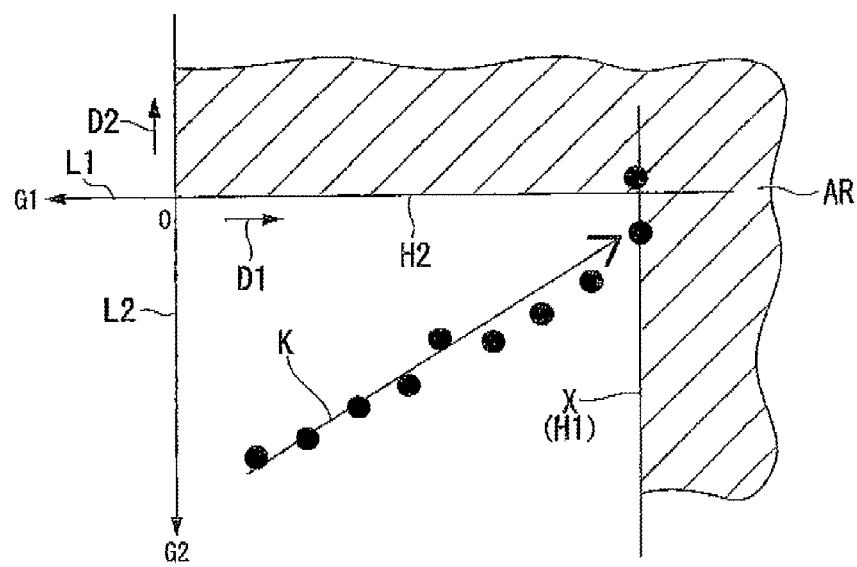
FIG. 11 is a diagram showing how a first deceleration and a second deceleration change over time in a case of a normal brake application.
Figure 12:
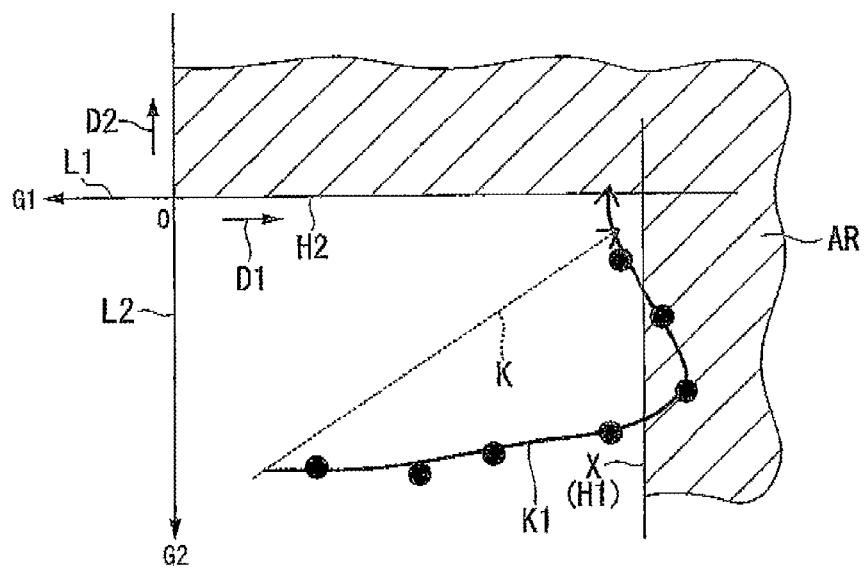
FIG. 12 is a diagram showing how the first deceleration and the second deceleration change over time in a case of sudden braking.

FIGS. 11 and 12 are diagrams on which changes in the first and second decelerations G1, G2 over time are plotted at predetermined intervals of time depending on how the driver applies the brake.

FIG. 11 is a diagram showing how the first deceleration G1 and the second deceleration G2 change over time in a case of a normal brake application. FIG. 12 is a diagram showing how the first deceleration G1 and the second deceleration G2 change over time in a case of the sudden braking.

Generally speaking, in the case of the normal brake application involving no large change in orientation, as shown in FIG. 11, the first deceleration G1 decreases over time, and the second deceleration G2 decreases in proportion to the decrease in the first deceleration G1. For this reason, a line K joining changes over time of plots representing the decelerations G1, G2 in the case of the normal brake application is linear. An arrow including the line K points toward a point of intersection between the first threshold value H1 and the second threshold value H2. If the first deceleration G1 or the second deceleration G2 enters the rear wheel lift tendency judgment area AR, it is judged that the pressure reduction control is needed to inhibit the rear wheel lift.

There is, however, a case where the application of the accelerations varies depending on how the driver applies the brake, how the suspensions are set up, and how the inclination of the road surface affects the orientation of the vehicle. For example, as shown in FIG. 12, the first deceleration G1 decreases rapidly over time if the driver applies a sudden brake involving a large change in the orientation. On the other hand, the second deceleration G2 shows almost no decrease for a certain length of time, and decreases rapidly over time after the first deceleration G1 slightly exceeds the predetermined value X. Incidentally, a curved line K1 in FIG. 12 is a line joining changes over time of plots representing the decelerations G1, G2 in the case of sudden braking.

In the embodiment, if the second-deceleration change rate G2' is greater in the second direction D2 than a change-rate threshold value Cth which is a predetermined threshold value, at least one of setting for shifting the first threshold value H1 in a direction opposite to the first direction D1 and setting for shifting the second threshold value H2 in a direction opposite to the second direction D2 is performed.

In addition, the setting for shifting the first threshold value H1 in the direction opposite to the first direction D1 is performed in a way that the first deceleration G1 comes closer to the first threshold value H1 in the first direction D1 as the second deceleration G2 comes closer to the second threshold value H2 in the second direction D2.

Figure 13:
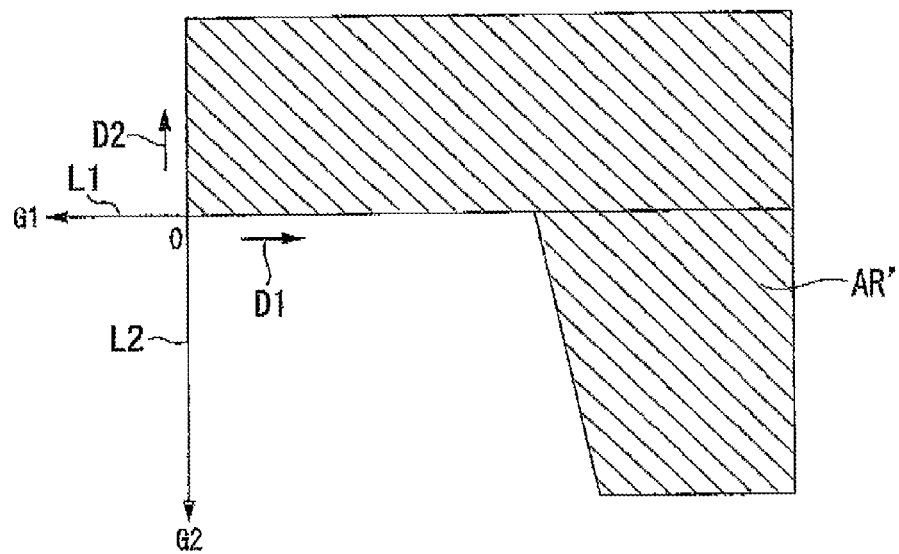
FIG. 13 is a schematic diagram showing a rear wheel lift tendency judgment area in the case of the sudden braking.

For example, the rear wheel lift tendency judgment area AR shown in FIG. 11 is set in the case of the normal brake application, while a rear wheel lift tendency judgment area AR' shown in FIG. 13 is set in the case of the sudden braking.

Figure 14:
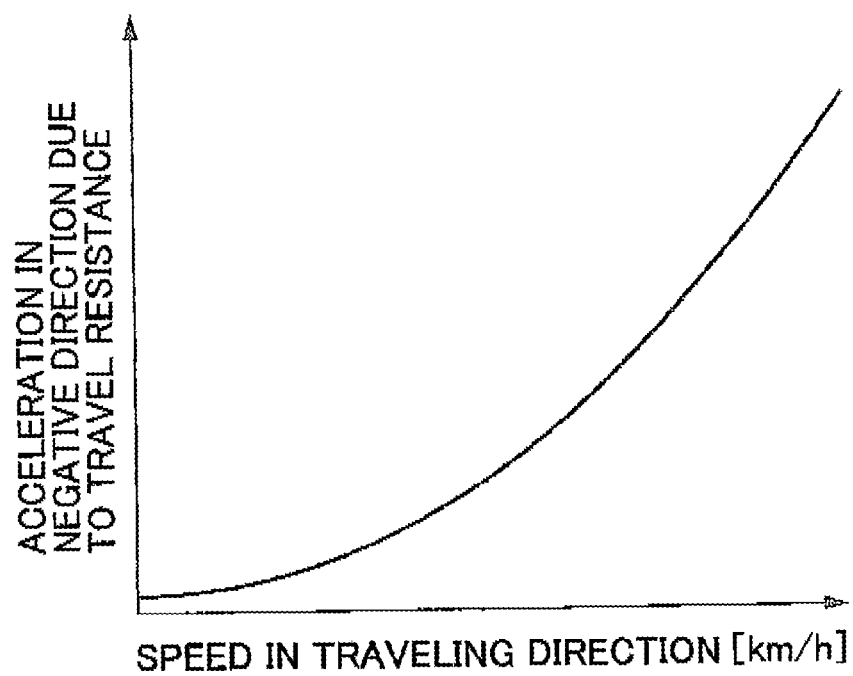
FIG. 14 is a diagram showing a relationship between a speed in the traveling direction and an acceleration in a negative direction due to a travel resistance.

Furthermore, an acceleration in the traveling direction due to a travel resistance such as an air resistance or the like (an acceleration in a direction negative to the traveling direction, hereinafter referred to simply as an "acceleration in the negative direction") occurs on the vehicle in addition to the acceleration in the traveling direction due to the brake application. FIG. 14 is a diagram showing a relationship between the speed in the traveling direction and an acceleration in the negative direction due to the travel resistance. In FIG. 14, the horizontal axis represents the speed in the traveling direction, and the vertical axis represents the acceleration in the negative direction due to the travel resistance.

As shown in FIG. 14, it is confirmed that like a quadratic function increases, the acceleration in the negative direction due to the travel resistance increases as the speed in the traveling direction increases.

Figure 15:
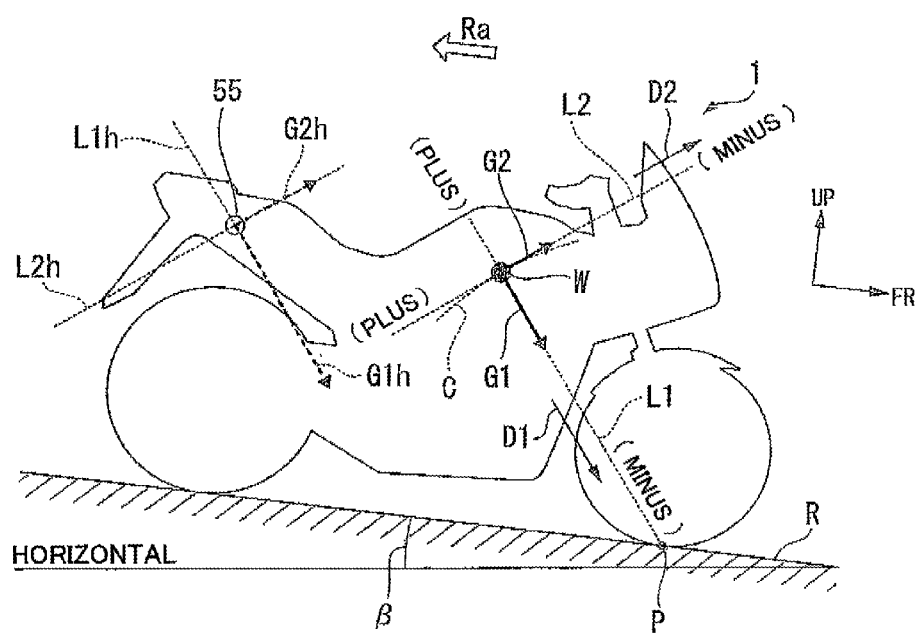
FIG. 15 is a side view of the two-wheeled motor vehicle, which shows accelerations acting on the center of gravity of the vehicle with the travel resistance taken into consideration.

FIG. 15 is a side view of the two-wheeled motor vehicle 1, which shows the accelerations acting on the center of gravity of the vehicle with the travel resistance taken into consideration.

As shown in FIG. 15, the acceleration censor 55 detects overall acceleration of the vehicle. When a travel resistance Ra (an air resistance, for example) is applied to the vehicle, a deceleration occurs on the center of gravity of the vehicle. For this reason, an influence of the travel resistance Ra on the first and second decelerations G1, G2 appears as an acceleration in the negative direction, like in the case of the brake application.

The acceleration in the negative direction due to the travel resistance Ra, however, has no direct influence on the rear wheel lift, and rather works in a direction of inhibiting the rear wheel lift. For this reason, it is desirable that the threshold value of the rear wheel lift tendency judgment area be shifted by the acceleration in the negative direction due to the travel resistance depending on the speed in the traveling direction.

The embodiment performs setting for shifting the second threshold value H2 in the second direction D2, when the traveling-direction speed $V_B$ becomes greater than a speed threshold value Vth which is a predetermined threshold value.

Figure 16:
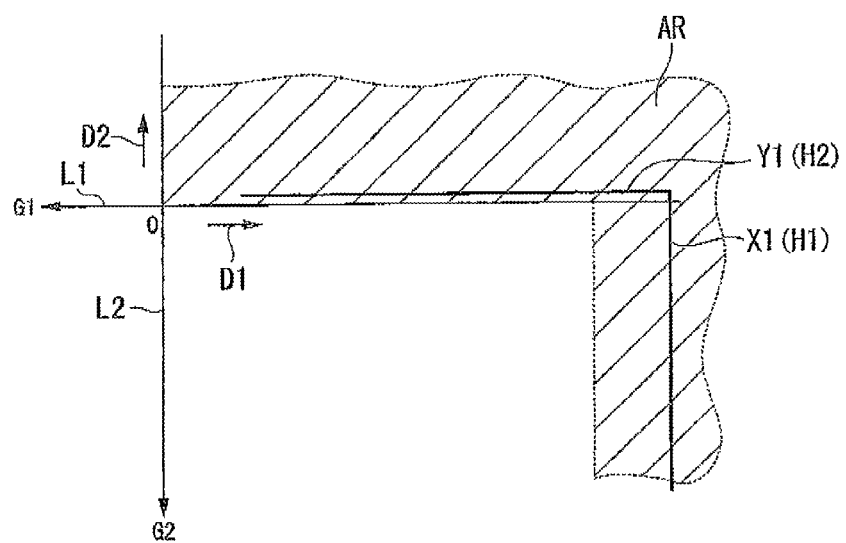
FIG. 16 is a schematic diagram showing how threshold values are shifted when a predetermined deceleration occurs due to a travel resistance.

For example, if the speed in the traveling direction is greater than the speed threshold value Vth, the embodiment sets the first threshold value H1 at a predetermine value X1 by shifting the first threshold value H1 in the first direction D1 by a predetermined amount, and sets the second threshold value H2 at a predetermined value Y1 by shifting the second threshold value H2 in the second direction D2 by a predetermined amount, as shown in FIG. 16.

It should be noted that when the second-deceleration change rate G2' becomes greater in the second direction D2 than the change-rate threshold value Cth which is the predetermined threshold value, the embodiment perform setting for shifting the second threshold value H2 in the direction opposite to the second direction D2 regardless of the traveling-direction speed $V_B$.

Figure 17:
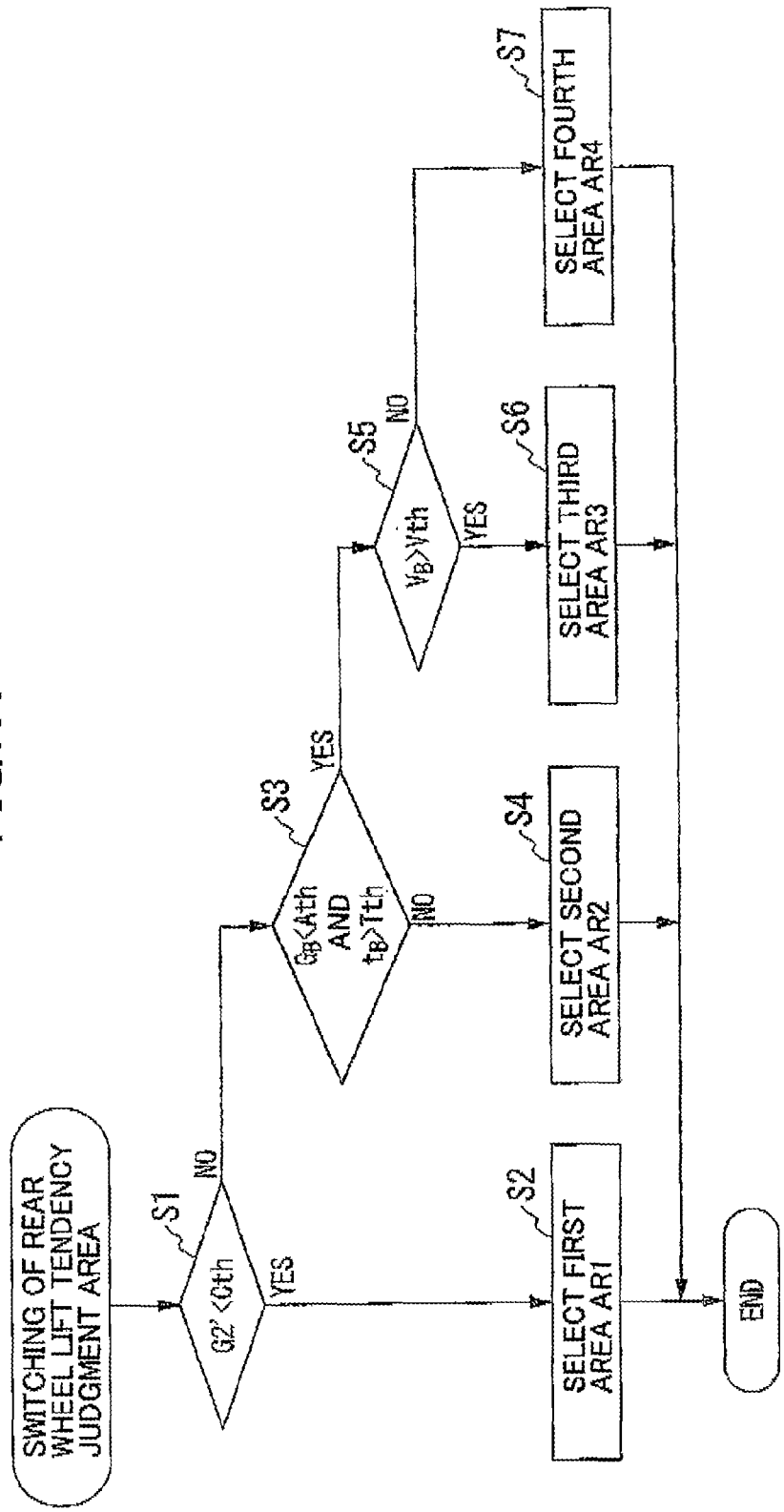
FIG. 17 is a flowchart showing how rear wheel lift tendency judgment area switching means switches the rear wheel lift tendency judgment area.
Figure 18:
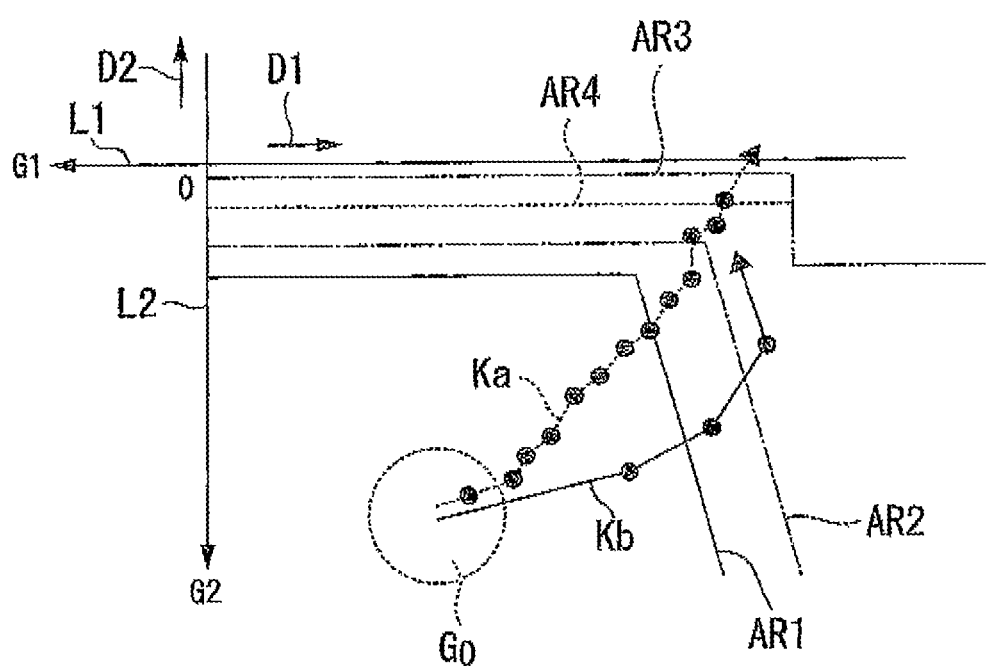
FIG. 18 is a diagram showing a rear wheel lift tendency judgment area which is a switching target, together with how the first and second decelerations change over time depending on how a driver applies the brake.

FIG. 17 is a flowchart showing how the rear wheel lift tendency judgment area switching means 75b switches the rear wheel lift tendency judgment area. FIG. 18 is a diagram showing the rear wheel lift tendency judgment area which is a switching target, together with how the first and second decelerations G1, G2 change over time depending on how the driver applies the brake. Incidentally, in FIG. 18, the changes in the first and second decelerations G1, G2 over time are plotted at each 10-ms interval of time, starting at a reference acceleration Go. In this respect, the reference acceleration Go is a value at a time when the acceleration sensor 55 starts to measure the decelerations G1, G2.

As shown in FIG. 17, the rear wheel lift tendency judgment area switching means 75b judges whether or not the second-deceleration change rate G2' is less than the change-rate threshold value Cth (step S1). In other words, the rear wheel lift tendency judgment area switching means 75b judges whether or not the second-deceleration change rate G2' is greater in the second direction D2 than the change-rate threshold value Cth. If the second-deceleration change rate G2' is less than the change-rate threshold value Cth, namely if the second-deceleration change rate G2' is greater in the second direction D2 than the change-rate threshold value Cth, the rear wheel lift tendency judgment area switching means 75b switches the rear wheel lift tendency judgment area to a first area AR1 (see FIG. 18) (step S2). This makes it easier to make the judgment on the tendency of the rear wheel lift even if change in behavior of the vehicle is large in an initial phase of the braking operation. Incidentally, the change-rate threshold value Cth is set, for example, at −40 to 60 m/s$^3$.

If the second-deceleration change rate G2' does not satisfy the condition of being less than the change-rate threshold value Cth, namely if the second-deceleration change rate G2' does not satisfy the condition of being greater in the second direction D2 than the change-rate threshold value Cth, the rear wheel lift tendency judgment area switching means 75b judges whether or not the traveling-direction acceleration $G_B$ is less than a predetermined acceleration Ath in the traveling direction and a time $t_B$ is greater than a time threshold value Tth (step S3). In this respect, the time $t_B$ is a length of time for which the traveling-direction acceleration $G_B$ is less than the predetermined acceleration Ath in the traveling direction.

If the traveling-direction acceleration $G_B$ dose not satisfy the condition of being less than the predetermined acceleration Ath in the traveling direction, or if the time $t_B$ does not satisfy the condition of being greater than the time threshold value Tth, the rear wheel lift tendency judgment area switching means 75b switches the rear wheel lift tendency judgment area to a second area AR2 (see FIG. 18) (step4). This makes it possible to make the judgment on the tendency of the rear wheel lift as appropriate even if the change in behavior of the vehicle is large in the initial phase of the braking operation.

If the traveling-direction acceleration $G_B$ is less than the predetermined acceleration Ath in the traveling direction and the time $t_B$ is greater than the time threshold value Tth, the rear wheel lift tendency judgment area switching means 75b judges whether or not the traveling-direction speed $V_B$ is greater than the speed threshold value Vth (step S5). If the traveling-direction speed $V_B$ is greater than the speed threshold value Vth, the rear wheel lift tendency judgment area switching means 75b switches the rear wheel lift tendency judgment area to a third area AR3 (see FIG. 18) (step6). This makes it possible to make the judgment on the tendency of the rear wheel lift more easily even if the travel resistance occurs.

If the traveling-direction speed $V_B$ dose not satisfy the condition of being greater than the speed threshold value Vth, the rear wheel lift tendency judgment area switching means 75b switches the rear wheel lift tendency judgment area to a fourth area AR4 (see FIG. 18) (step7). This makes it easier to make the judgment on the tendency of the rear wheel lift, and enhances accuracy, if the change in behavior of the vehicle is substantially constant in a final phase of the braking operation.

Returning to FIG. 9, a result of the switching by the rear wheel lift tendency judgment area switching means 75b is inputted into the rear wheel lift tendency judging means 75a.

On the basis of the traveling-direction acceleration $G_B$, the acceleration judging means 75c judges whether or not a predetermined acceleration occurs. For example, if the traveling-direction acceleration $G_B$ calculated by the acceleration-in-traveling-direction calculating means 71 is greater than a second predetermined acceleration in the traveling direction, the acceleration judging means 75c judges that the predetermined acceleration occurs.

A result of the judgment by the acceleration judging means 75c is inputted into the pressure reduction controlling means 75d.

On the basis of the result of the judgment by the rear wheel lift tendency judging means 75a and the result of the judgment by the acceleration judging means 75c, the pressure reduction controlling means 75d judges whether or not the pressure reduction control needs to be performed to inhibit the rear wheel lift. If the rear wheel lift tendency judging means 75a judges that the pressure reduction control needs to be performed on the front wheel brake 13 in order to inhibit the rear wheel lift, and if the acceleration judging means 75c judges that the predetermined acceleration occurs, the pressure reduction controlling means 75d creates a pressure reduction control signal Jb for inhibiting the rear wheel lift.

The created pressure reduction control signal Jb is inputted into the control selector means 76, which performs the pressure reduction control on the front wheel brake 13 in a way that the second deceleration G2 becomes equal to zero, or takes on a positive value.

As shown in FIG. 5, the control selector means 76 selects a control with a higher priority if both the ABS control signal Ja from the ABS control means 72 and the pressure reduction control signal Jb from the rear wheel lift inhibition control means 75 are inputted into the control selector means 76.

In order of priority, the control selector means 76 selects, in the first place, the "pressure reduction control in the ABS control" or the "pressure reduction control for inhibiting the rear wheel lift" in terms of a larger amount of pressure reduction, in the second place, the pressure retention control in the ABS control, and in the third place, the pressure augmentation control in the ABS control. In other words, the pressure reduction control is a control with the highest priority.

The control signal selected by the control selector means 76 is inputted into the fluid pressure unit 11. After passing the fluid pressure unit 11, the control signal is inputted into the motor driver 20a.

Descriptions will be hereinbelow provided for how the controller 20 of the embodiment controls the braking force on the front wheel brake 13.

Once the front wheel brake 13 produces the braking force in response to the driver's manipulation of the brake lever 12 and input of the manipulation into the front wheel brake 13, the two-wheeled motor vehicle 1 starts to decelerate, and the traveling-direction speed $V_B$ decreases.

If during the deceleration, the absolute value of the component $G2b$ of the traveling-direction acceleration $G_B$ in the second deceleration G2 becomes greater than the component $G2a$ of the gravitational acceleration g, the rear wheel lift tendency judging means 75a of the rear wheel lift inhibition control means 75 judges that the pressure reduction control needs to be performed.

It should be noted that the judgment by the rear wheel lift tendency judging means 75a incorporates the result of the switching of the rear wheel lift tendency judgment area by the rear wheel lift tendency judgment area switching means 75b. In parallel to this, on the basis of the traveling-direction acceleration $G_B$, the acceleration judging means 75c judges whether or not the predetermined acceleration occurs. If the acceleration judging means 75c judges that the predetermined acceleration occurs, the pressure reduction controlling means 75d issues a request for the pressure reduction to inhibit the rear wheel lift. The rear wheel lift inhibition control means 75 inputs the pressure reduction control signal Jb for performing the pressure reduction control on the front wheel brake 13 into the control selector means 76.

If the ABS control signal Ja for the ABS control is inputted into the control selector means 76, or if the pressure reduction control signal Jb for inhibiting the rear wheel lift is inputted into the control selector means 76, the control selector means 76 performs the pressure reduction control on the fluid pressure unit 11.

As described above, the brake control system 10 of the embodiment is installed in the two-wheeled motor vehicle 1 including the front wheel 2 and the rear wheel 3. In the brake control system 10, in the side view, the first straight line L1 represents a straight line which joins the center W of gravity of the vehicle and the ground contact point P of the front wheel 2; the second straight line L2 represents a straight line which passes the center W of gravity and is orthogonal to the first straight line L1; the first direction D1 represents a direction which extends along the first straight line L1, and which points from the center W of gravity to the ground contact point P; and the second direction D2 represents a direction which extends along the second straight line L2, and in which the vehicle 1 turns forward around the ground contact point P. The brake control system 10 includes: the first deceleration obtaining means 73 for obtaining the first deceleration G1 which is the component in the first direction D1 of the acceleration on the center W of gravity; and the second deceleration obtaining means 73 for obtaining the second deceleration G2 which is the component in the second direction D2 of the acceleration on the center W of gravity. If the first deceleration G1 is greater in the first direction D1 than the first threshold value H1, or if the second deceleration G2 is greater in the second direction D2 than the second threshold value H2, the brake control system 10 judges that the rear wheel 3 is likely to get lifted. In addition, if the second-deceleration change rate G2' which is the amount of change in the second deceleration G2 per unit time becomes greater in the second direction D2 than the change-rate threshold value Cth, the brake control system 10 performs at least one of the setting for shifting the first threshold value H1 in the direction opposite to the first direction D1 and the setting for shifting the second threshold value H2 in the direction opposite to the second direction D2.

According to the embodiment, in a stage where the second-deceleration change rate G2' is growing larger and the tendency of the rear wheel lift is increasing rapidly, the brake control system 10 is capable of shifting at least one of the first threshold value H1 and the second threshold value H2 toward the side where the judgment on the tendency of the rear wheel lift is made easily. For this reason, the brake control system 10 is capable of making the judgment on the tendency of the rear wheel lift quickly.

In addition, if the traveling-direction speed $V_B$ becomes greater than the speed threshold value Vth, the brake control system 10 of the embodiment performs the setting for shifting the second threshold value H2 in the second direction D2. Thereby, when the increase in the traveling-direction speed $V_B$ makes the travel resistance become larger and the load for inhibiting the rear wheel lift becomes gradually larger on the vehicle, the brake control system 10 is capable of shifting the second threshold value H2 toward the side where the judgment on the tendency of the rear wheel lift is made less easily. For this reason, the brake control system 10 is capable of making the judgment on the tendency of the rear wheel lift quickly and accurately.

Furthermore, the brake control system 10 of the embodiment performs the setting for shifting the second threshold value H2 in the direction opposite to the second direction D2 regardless of the traveling-direction speed $V_B$ if the second-deceleration change rate G2' becomes greater in the second direction D2 than the change-rate threshold value Cth. Thereby, even when the increase in the traveling-direction speed $V_B$ makes the travel resistance become larger and the load for inhibiting the rear wheel lift becomes gradually larger on the vehicle, the brake control system 10 shifts the second threshold value H2 toward the side where the judgment on the tendency of the rear wheel lift is made easily in the stage where the second-deceleration change rate G2' is growing larger and the tendency of the rear wheel lift is increasing rapidly. For this reason, the brake control system 10 is capable of making the judgment on the tendency of the rear wheel lift quickly and accurately.

Moreover, the brake control system 10 of the embodiment performs the setting for shifting the first threshold value H1 in the direction opposite to the first direction D1 in the way that the first deceleration G1 comes closer to the first threshold value H1 in the first direction D1 as the second deceleration G2 comes closer to the second threshold value H2 in the second direction D2. Thereby, as the second deceleration G2 becomes greater, the brake control system 10 more shifts the first threshold value H1 toward the side where the judgment on the tendency of the rear wheel lift is made easily. For this reason, the brake control system 10 is capable of making the judgment on the tendency of the rear wheel lift quickly and accurately.

Additionally, in the brake control system 10 of the embodiment, the acceleration sensor 55 is housed inside the cover 81 placed in the rear of the seat 80 on which the driver gets seated. Thus, it is suitable for the acceleration sensor 55 to be disposed in the place offset from the center W gravity of the vehicle in the direction of becoming farther from the ground contact point P.

It should be noted that although the foregoing embodiment takes the case where the two-wheeled motor vehicle 1 is traveling on a slope road at a road surface inclination angle β (a gradient β), the configuration of the embodiment is applicable to a case where the two-wheeled motor vehicle 1 is traveling on a horizontal road surface. In other words, the brake control system 10 of the embodiment is capable of making the judgment on the tendency of the rear wheel lift quickly no matter what road surface the two-wheeled motor vehicle 1 is traveling on.

In addition, the foregoing embodiment has been described citing the case where the acceleration signal conversion means 73 obtains both the first deceleration G1 and the second deceleration G2, but is not limited to this. For example, the embodiment may instead include: first deceleration obtaining means for obtaining only the first deceleration G1; and second deceleration obtaining means for obtaining only the second deceleration G2.

Furthermore, in the foregoing embodiment, the speed threshold value Vth may be set at a certain value (50 km/h to 70 km/h). Otherwise, the speed threshold value may be continuously changed depending on the speed in the traveling direction, because the air resistance increases in proportion to the square of the speed in the traveling direction. The other threshold values, including the change-rate threshold value Cth and the like, may be changed depending on the necessity as well.

Although the embodiment of the present invention has been described so far, the configuration of the embodiment is one example of the present invention. Various modifications may be made without departing from the gist of the present invention by replacement of constituents of the embodiment with known ones, and the like.

For example, on-board camera images or the GPS (Global Positioning System) may be used as the means for obtaining the speed in the traveling direction.

What is claimed is:

1. A vehicle rear wheel lift tendency judgment device which is installed in a vehicle including a front wheel and a rear wheel, and judges whether or not the rear wheel is likely to be lifted, wherein when in a side view, a first straight line represents a straight line which joins a center of gravity of the vehicle and a ground contact point of the front wheel; a second straight line represents a straight line which passes the center of gravity and is orthogonal to the first straight line; a first direction represents a direction which extends along the first straight line, and which points from the center of gravity to the ground contact point; and a second direction represents a direction which extends along the second straight line, and in which the vehicle turns forward around the ground contact point, the judgment device comprises:
a first deceleration obtaining device for obtaining a first deceleration which is a component in the first direction of an acceleration on the center of gravity; and
a second deceleration obtaining device for obtaining a second deceleration which is a component in the second direction of the acceleration on the center of gravity, wherein the judgment device judges that the rear wheel is likely to be lifted, when the first deceleration is greater in the first direction than a first threshold value, or when the second deceleration is greater in the second direction than a second threshold value, and the judgment device performs at least one of setting for shifting the first threshold value in a direction opposite to the first direction and setting for shifting the second threshold value in a direction opposite to the second direction, when a second-deceleration change rate, which is a change amount in the second deceleration per unit time, becomes greater in the second direction than a change-rate threshold value.

2. The vehicle rear wheel lift tendency judgment device according to claim 1, further comprising:
a speed-in-traveling-direction obtaining device for obtaining a traveling-direction speed of the vehicle, wherein
when the traveling-direction speed becomes greater than a speed threshold value, the judgment device performs setting for shifting the second threshold value in the second direction.

3. The vehicle rear wheel lift tendency judgment device according to claim 2, wherein
when the second-deceleration change rate becomes greater in the second direction than the change-rate threshold value, the judgment device performs the setting for shifting the second threshold value in the direction opposite to the second direction regardless of the traveling-direction speed.

4. The vehicle rear wheel lift tendency judgment device according to claim 1, wherein the judgment device performs the setting for shifting the first threshold value in the direction opposite to the first direction so that the first deceleration comes closer to the first threshold value in the first direction as the second deceleration comes closer to the second threshold value in the second direction.

5. The vehicle rear wheel lift tendency judgment device according to claim 1, wherein
the vehicle is a two-wheeled motor vehicle, and
an acceleration sensor for detecting an acceleration of the vehicle is housed right under a seat on which a driver gets seated, or inside a cover disposed in a rear of the seat.

6. The vehicle rear wheel lift tendency judgment device according to claim 2, wherein the judgment device performs the setting for shifting the first threshold value in the direction opposite to the first direction so that the first deceleration comes closer to the first threshold value in the first direction as the second deceleration comes closer to the second threshold value in the second direction.

7. The vehicle rear wheel lift tendency judgment device according to claim 3, wherein the judgment device performs the setting for shifting the first threshold value in the direction opposite to the first direction so that the first deceleration comes closer to the first threshold value in the first direction as the second deceleration comes closer to the second threshold value in the second direction.

8. The vehicle rear wheel lift tendency judgment device according to claim 2, wherein
the vehicle is a two-wheeled motor vehicle, and
an acceleration sensor for detecting an acceleration of the vehicle is housed right under a seat on which a driver gets seated, or inside a cover disposed in a rear of the seat.

9. The vehicle rear wheel lift tendency judgment device according to claim 3, wherein
the vehicle is a two-wheeled motor vehicle, and
an acceleration sensor for detecting an acceleration of the vehicle is housed right under a seat on which a driver gets seated, or inside a cover disposed in a rear of the seat.

* * * * *